(No Model.)  3 Sheets—Sheet 1.

M. H. McCHESNEY.
KEY BOARD FOR MUSICAL INSTRUMENTS.

No. 281,898. Patented July 24, 1883.

Attest:
N. T. Sprague
E. Scully

Inventor:
M. H. McChesney
By Thos. S. Sprague
Att'y.

N. PETERS. Photo-Lithographer, Washington. D. C.

(No Model.)  3 Sheets—Sheet 2.

M. H. McCHESNEY.
KEY BOARD FOR MUSICAL INSTRUMENTS.

No. 281,898. Patented July 24, 1883.

Attest:
N. J. Sprague
E. Scully

Inventor:
M. H. McChesney
By Wm. S. Sprague
Att'y (No Model.)  M. H. McCHESNEY.  3 Sheets—Sheet 3.
KEY BOARD FOR MUSICAL INSTRUMENTS.
No. 281,898.  Patented July 24, 1883.

Attest:  Inventor:
Martin H. McChesney.
By Thos. S. Sprague
Att'y.

UNITED STATES PATENT OFFICE.

MARTIN H. McCHESNEY, OF DETROIT, MICHIGAN.

KEY-BOARD FOR MUSICAL INSTRUMENTS.

SPECIFICATION forming part of Letters Patent No. 281,898, dated July 24, 1883.

Application filed February 16, 1882. (No model.)

*To all whom it may concern:*

Be it known that I, MARTIN H. McCHESNEY, of Detroit, in the county of Wayne and State of Michigan, have invented new and useful Improvements in Key-Boards for Musical Instruments; and I hereby declare that the following is a full, clear, and exact description thereof, reference being had to the accompanying drawings, which form a part of this specification.

The nature of this invention relates to certain new, useful, and novel improvements in the construction and arrangement of key-boards for musical instruments, the object of the invention being, first, to provide a plane surface for the thumb when it is obliged to use the so-called "flats" and "sharps," which will render its touch very certain and easy; second, to simplify the learning of scales, arpeggios, and musical forms of whatsoever nature; third, to enable the performer to more easily transpose a piece of music from one key to another; fourth, to enable the performer to change the individuality of any certain key, scale, or mode to that of any other key, scale, or mode; fifth, to enable the performer to make a glissando from a so-called "natural" to a so-called "flat" or "sharp" lying immediately above or below it; sixth, to enable the performer to execute a chromatic scale by the glissando, all of such objects being attained without the necessity of learning a new method of playing or fingering.

To this end the invention consists in the peculiar construction and arrangement of a supplemental set of keys in front of the ordinary key-board of a piano or similar instrument, and the prolongation to the front of the first row of an ordinary key-board, all as more fully hereinafter described.

Figure 1:
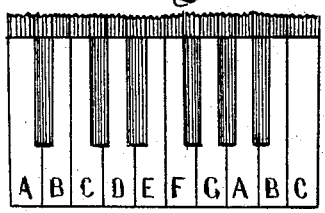
Figure 2:
Figure 3:
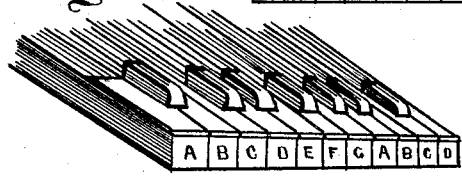
Figure 4:
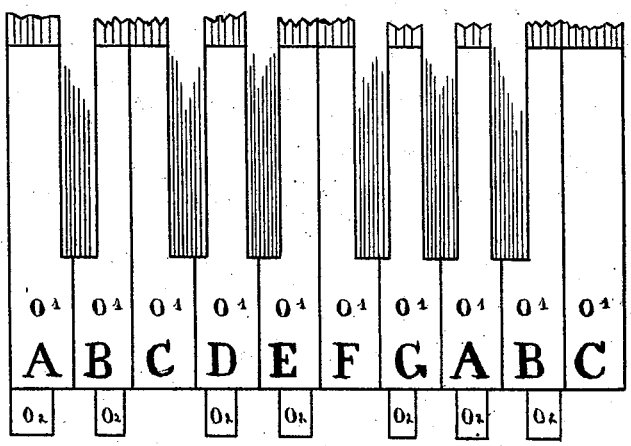
Figure 5:
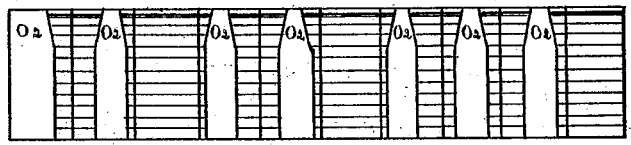
Figure 6:
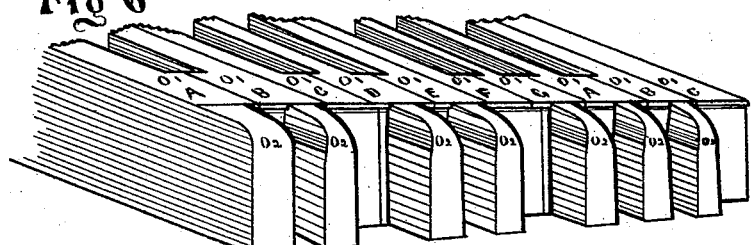
Figure 7:
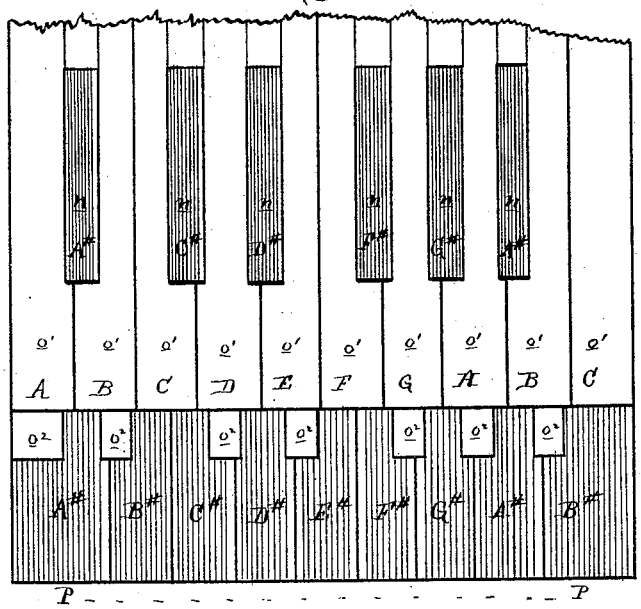
Figure 8:
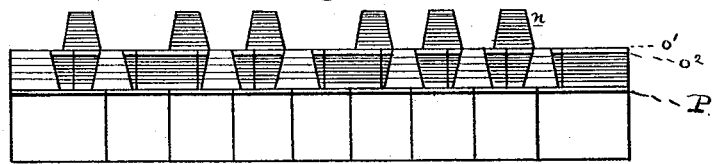
Figure 9:
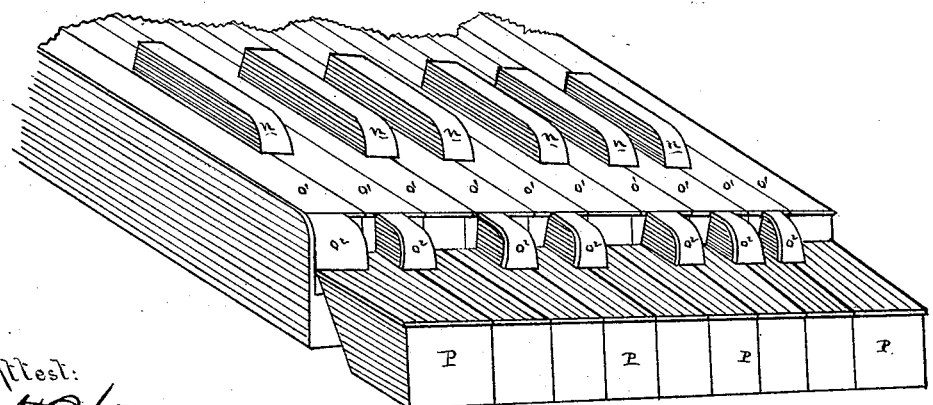
Figure 10:
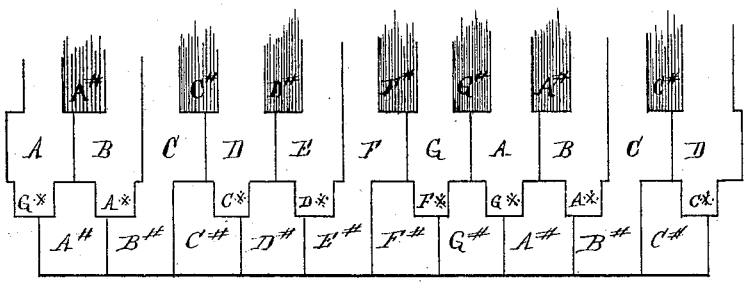
Figure 11:
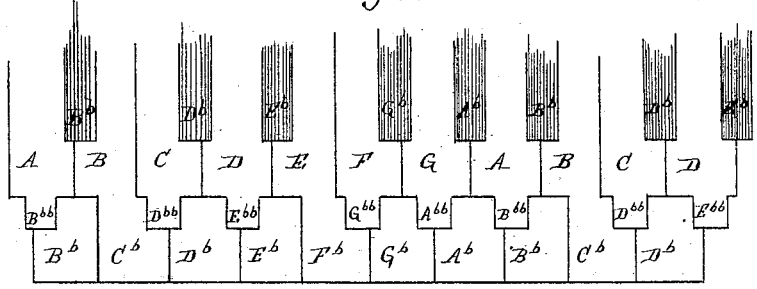

Figure 1 is a plan, Fig. 2 a front elevation, Fig. 3 a perspective, of a section of the ordinary key-board. Fig. 4 is a plan, Fig. 5 a front elevation, Fig. 6 a perspective, of the second row of keys of my improvement. Fig. 7 is a ground plan of the first row of keys, showing their arrangement in relation to the second and third rows. Fig. 8 is a front elevation of the playing-surfaces as arranged in Fig. 7, and Fig. 9 is a perspective of the same. Fig. 10 is a plan showing arrangement of keys for producing the tones of the diatonic major scale of C-sharp. Fig. 11 is a similar view, showing arrangement of keys for producing the tones of the diatonic major scale of C-flat.

The keys of the third row, counting from the front, are all of the same size, shape, and arrangement of their playing-surfaces as in the present or ordinary key-board. The keys of the second row are of the same shape, size, and arrangement of their playing-surfaces as in the front row of the present or ordinary key-board, except that certain of them have elongations or extensions to the front, and either of two arrangements or plans may be adopted in regard to the particular keys of the second row which shall be so elongated. In the first arrangement or plan the elongations will be made on the keys A, C, D, F, and G. In the second arrangement or plan the elongations will be made on the keys A, B, D, E, and G. In this arrangement such elongations to the front, Figs. 4 to 7, are marked $o^2$, the second row in my plan being designated $o'$, in addition to their musical letter, the elongations $o^2$ having their playing-surfaces upon the same plane, or nearly so, as the broader portions $o'$ of the same keys. The keys of the first row are of the same size and shape of their playing-surfaces as the second row, except that they have no elongations to the front, and excepting, also, that certain of them are cut away, so that their surface outline nearest the second row conforms to the outline of the second row. However, the keys of the first row have their playing-surfaces upon a lower plane than the playing-surfaces of the keys of the second row, such first row being lettered P. Some of the keys of the first row, when played upon, produce the same tones as by the keys of the third row, or black keys of the ordinary key-board, the same being designated in the drawings hereto by $n$, and others produce the same tones as by the keys of the second row. Either of two arrangements or plans may be adopted as to what particular tones shall be produced by the keys of the first row when played upon. In the first arrangement or plan the tones belonging to the diatonic major scale of C-flat, and the keys acting upon the tones C-flat, D-flat, E-flat, F-flat, G-flat, A-flat, and B-flat will form an unbroken and constantly-ascending series. In the second arrangement or plan for the front rows of keys the tones will belong to the diatonic major scale of C-sharp, and the keys acting upon the tones C-sharp, D-sharp, E-sharp, F-sharp, G-sharp, A-sharp, and B-sharp will form an unbroken and constantly-ascending series. Fig. 7 in the accompanying drawings is a ground plan according to this second arrangement, as above described, in combination with the ordinary key-board and elongated keys, while Fig. 8 shows in front elevation the planes of the playing-surfaces of the three rows of keys, the front row in Fig. 7 being designated, in addition to P, by the musical letter A-sharp, B-sharp, C-sharp, D-sharp, E-sharp, F-sharp, G-sharp, A-sharp, B-sharp; and it will be seen in this arrangement that while the front row of keys is upon the same plane as to playing-surfaces and arranged closely together, some of such keys will produce the same tone as some of the so-called "natural" keys in the second row, while others will produce the same tones as some of the third row, or so-called "black" keys of the ordinary piano—as, for instance, B-sharp of the front row will produce the same tone as C in the second row, while C-sharp in the first row produces the same tone as C-sharp in the third row.

In my improvement, to produce the tones of the diatonic major scale of C-sharp the following keys of the front row are connected with keys of the third row bearing the same name, viz: A-sharp, C-sharp, D-sharp, F-sharp, G-sharp, and the following keys of the front row are connected with keys of the second row, viz: B-sharp with C and E-sharp with F, Figs. 7 and 10. In the second row each narrow prolongation to the front represents the same key with its name enharmonically changed—for instance, the prolongation of A becomes G double sharp, &c. Thus these narrow prolongations of the second row appeal to the eye, and stand in the same relation to the keys of the front row as the narrow black keys of the third row do to the broad playing-surfaces of the second row. In other words, the front row, taken in connection with the narrow elongations of the second row, furnishes the player with a chromatic scale, as also do the broader portions of the second row, taken in connection with the black narrow keys of the third row.

To produce the tones belonging to the major diatonic scale of C-flat, the same keys in the front row and third row are connected with each other, (although their names are enharmonically changed,) as was the case when arranged to produce the diatonic major scale of C-sharp; but the elongations are on somewhat different keys of the second row, being upon the keys A, C, D, F, and G, Fig. 11. In the scale of C-sharp, in the front row C and B sharp and F and E sharp are connected together, while in the scale of C-flat B and C flat and E and F flat are connected together.

One object of the invention, as hereinbefore related, is to enable the performer to change the individuality of any certain key to that of another key, and this I will describe.

In the key-board in present or ordinary use each key, scale, or mode offers to the performer certain facilities of execution, and also certain difficulties peculiarly its own, and the performance of any piece of music written particularly for a certain key—carefully adapted to that key—will be attended by greater difficulties when performed in a key different from that in which it was written. In the key-board of my invention each key, scale, or mode has two distinct individualities, either of which may be used, thus placing at the disposal of the composer or performer a much greater field of possibilities, both easy and difficult, than in the ordinary key-board, and yet no new method of learning or playing is required; and it can readily be seen that the performer can easily produce a glissando from a so-called "natural" to a so-called "flat" or "sharp" lying immediately above or below it, and that a chromatic scale by the glissando can be easily executed. This chromatic glissando movement is made upon the front and second rows of keys, played at the same time, a different finger playing each row. The front row of keys produce a diatonic scale, and are of a shape and structure already familiar to the eye and hand of the player of the key-board in common use, and they are broad, and a fine and certain touch to the fingers in repeating.

I am aware of the patent granted August 7, 1860, to C. J. Schoeneman, and Phillippi October 11, 1859, and hereby disclaim the same.

What I claim as my invention is—

1. In a key-board for musical instruments, and in combination with the first row of an ordinary key-board provided with narrow prolongations to the front, substantially as specified, and in the same plane therewith, the supplemental front row of keys arranged upon the same plane with each other, certain of which are connected with some of the keys of the second row, and others connected with some of the keys of the third row, whereby one of the diatonic scales may be played upon the front or supplemental row of keys, substantially as herein shown and specified.

2. A key-board for musical instruments, consisting of the three rows of keys P o' n, the rows o' being provided with prolongations $o^2$, constructed, arranged, and operating substantially in the manner and for the purposes herein specified.

3. In a key-board for musical instruments, the combination, with an ordinary key-board, of a supplemental front row of keys arranged upon the same plane with each other, certain thereof being connected with the ordinary or primary keys representing intervals of a whole tone, and certain thereof being connected with the remaining keys representing the intervening semitones, whereby enharmonic changes may be made by depressing the keys of said supplemental key-board, substantially as set forth.

MARTIN H. McCHESNEY.

Witnesses:
    E. SCULLY,
    H. S. SPRAGUE.